Jan. 20. 1925.
C. L. NORTON
MACHINE FOR MAKING MOLDED SHAPES FROM REFRACTORY MATERIAL
Filed July 24, 1922   6 Sheets-Sheet 6
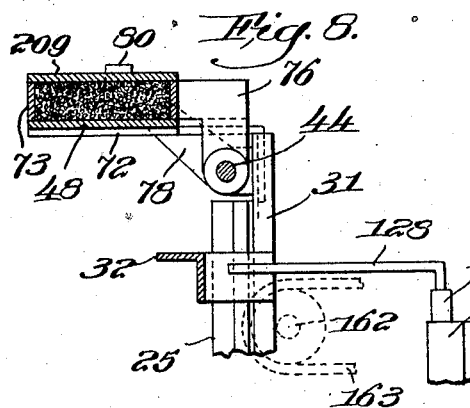
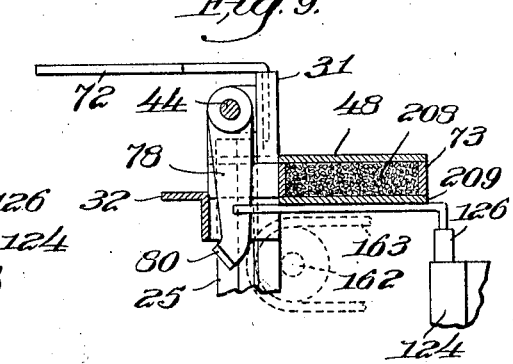
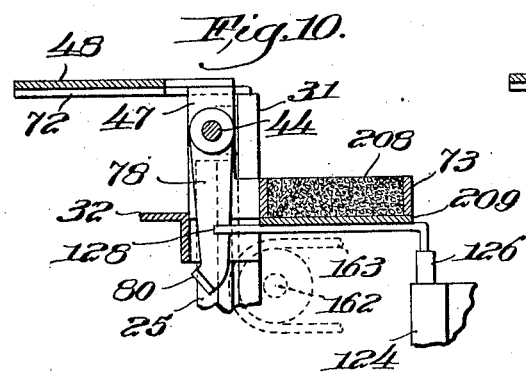
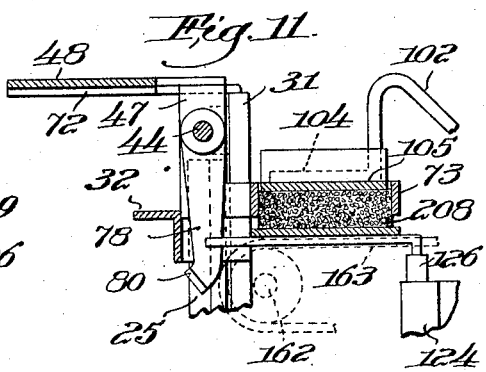
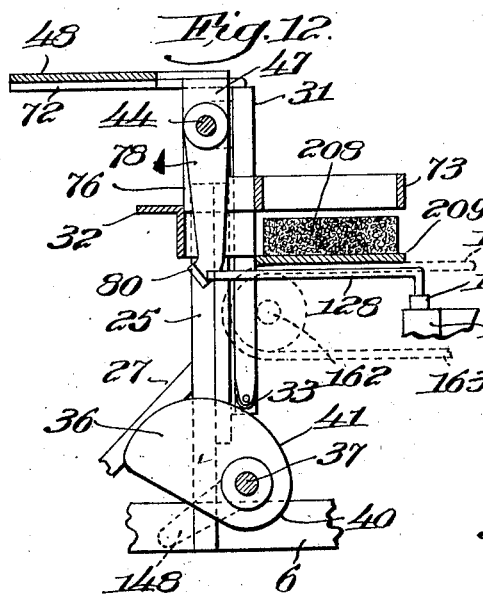
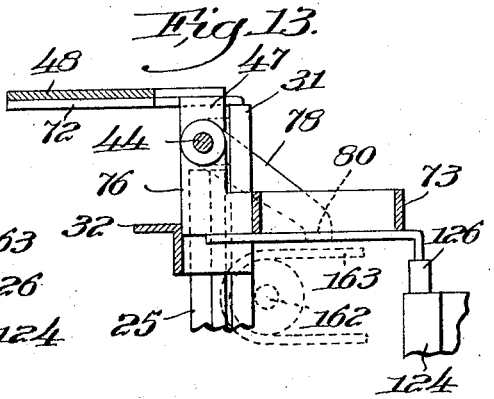
Inventor:
Charles L. Norton,
by Roberts, Roberts & Cushman
his Attys.

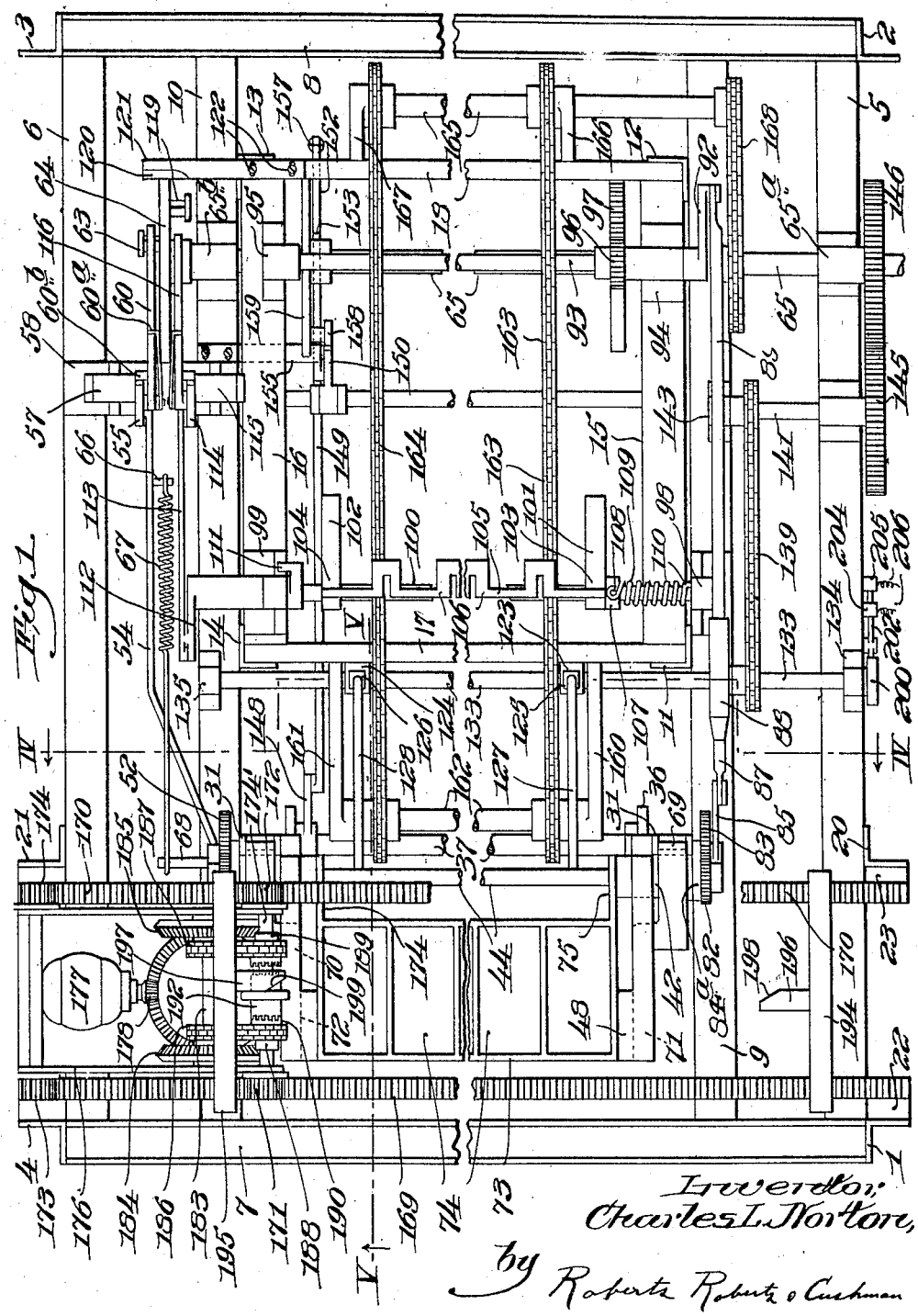

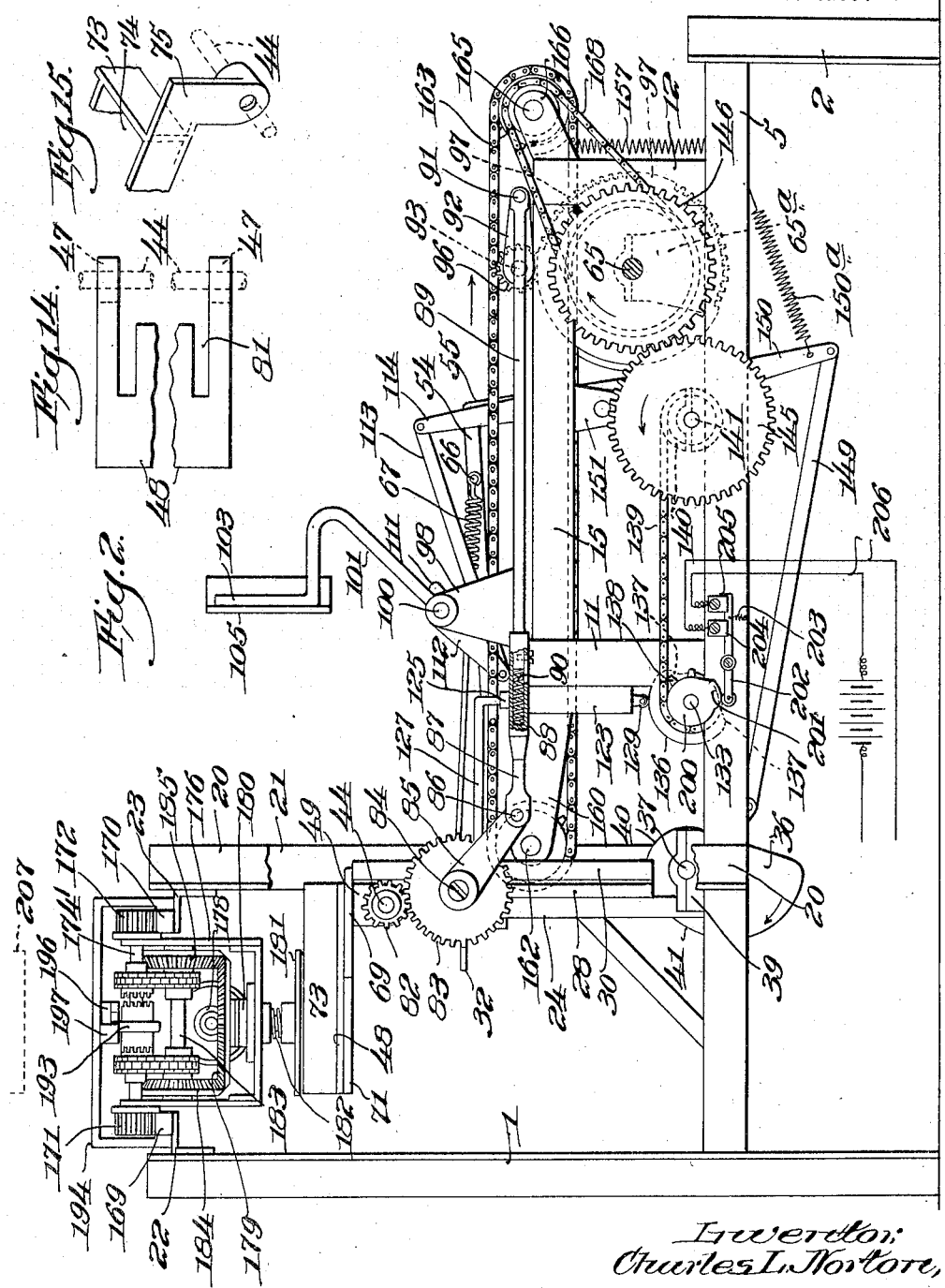

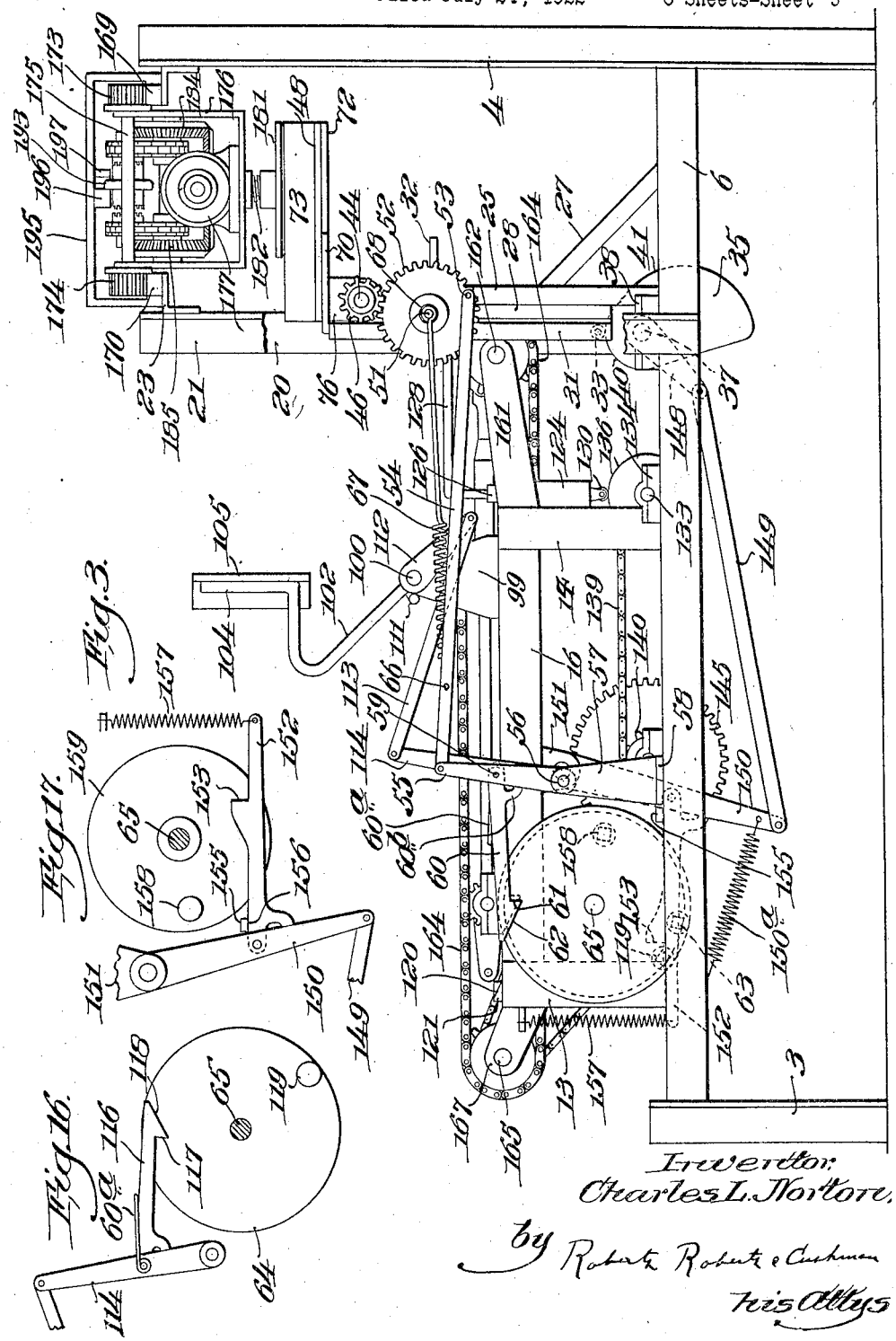

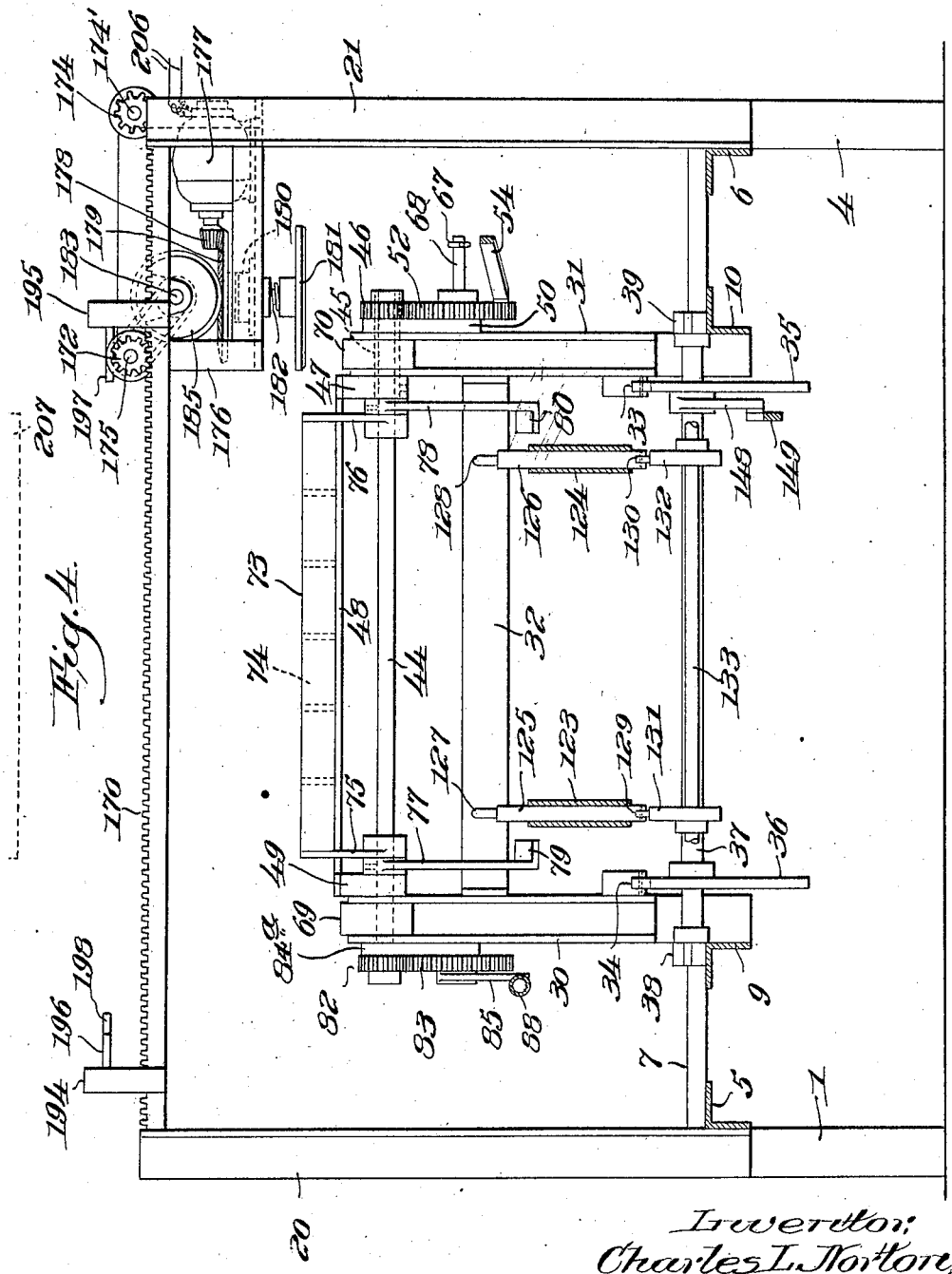

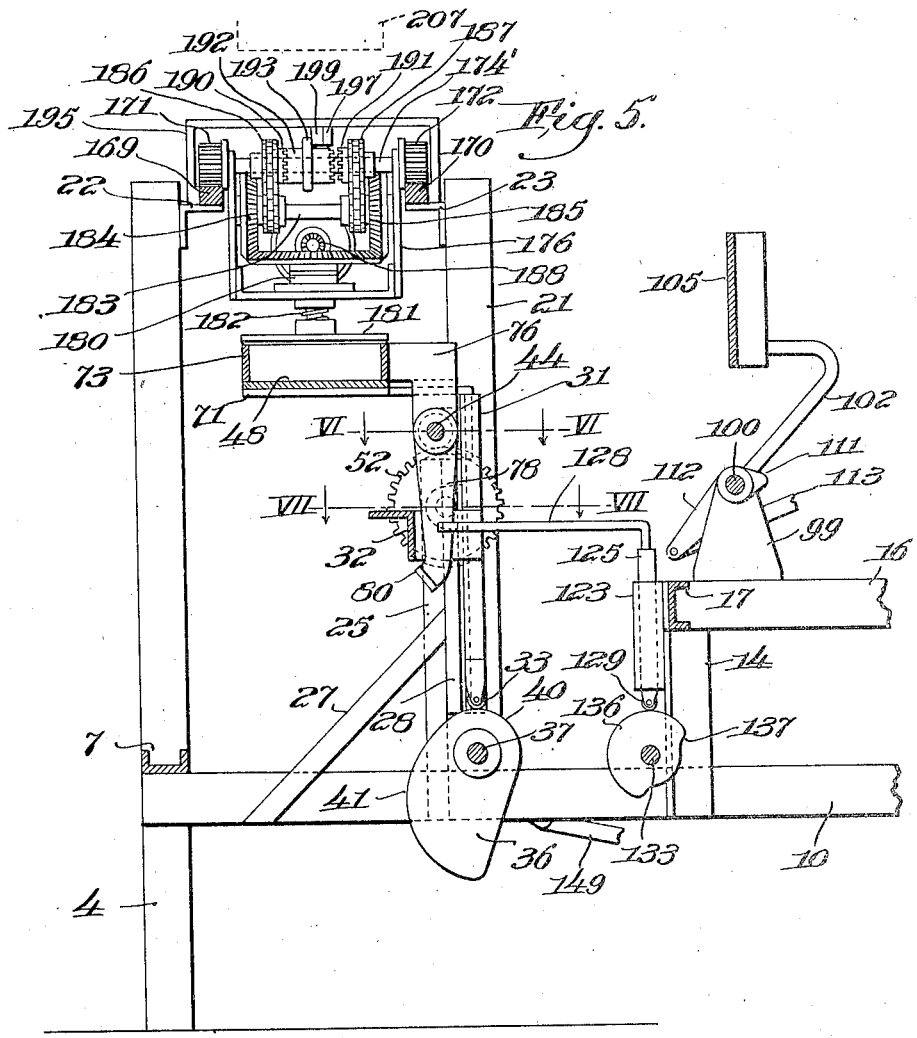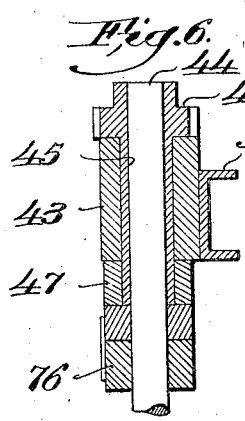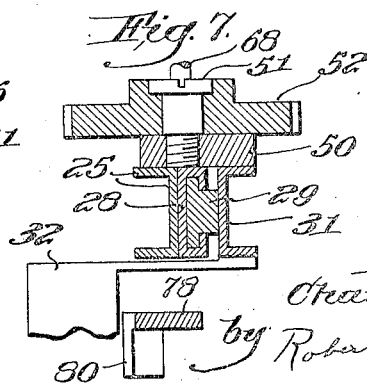

Patented Jan. 20, 1925.

1,523,830

UNITED STATES PATENT OFFICE.

CHARLES L. NORTON, OF BOSTON, MASSACHUSETTS, ASSIGNOR TO REFRACTORIES MACHINERY MANUFACTURING COMPANY, OF PITTSBURGH, PENNSYLVANIA, A CORPORATION OF PENNSYLVANIA.

MACHINE FOR MAKING MOLDED SHAPES FROM REFRACTORY MATERIAL.

Application filed July 24, 1922. Serial No. 576,957.

*To all whom it may concern:*

Be it known that I, CHARLES L. NORTON, a citizen of the United States of America, and resident of Boston, in the county of Suffolk and State of Massachusetts, have invented new and useful Improvements in Machines for Making Molded Shapes from Refractory Material, of which the following is a specification.

This invention concerns the manufacture of molded shapes and relates more particularly to a mechanism whereby such shapes may automatically be formed in commercial quantities with a minimum amount of manual labor and in an expeditious manner.

The mechanism herein disclosed is intended more especially for use in the molding of shapes such for example as brick, from ground ganister, or other refractory material possessing similar physical characteristics, and which is exceedingly difficult to handle by any of the methods or apparatus ordinarily available for use in the molding of shapes from fictile materials such as are customarily encountered.

In accordance with the usual hand method of molding brick shapes from such refractory material, the workman first places a mold box (open at top and bottom) upon a supporting plate or moldboard which is hinged along one of its lateral edges so that it can be swung over into inverted position. This plate is commonly provided with raised characters of suitable form which serve to impress the brick, during molding, with the desired indicia commonly placed upon brick for indicating its quality or the maker. The plate, and the interior of the mold-box are then usually sprinkled with dry sand to prevent adhesion of the plastic material thereto. The mold being thus prepared, the workman seizes a mass of the plastic material with both hands and hurls it with great force into the mold-box. The mass of material projected toward the mold-box in this manner must, for proper results, be greatly in excess of the cubic capacity of the mold, and the surplus material overflowing the top of the mold is then "slicked off" by the workman by the aid of a suitable hand implement, the material within the mold-box being at the same time compacted to a certain degree. A pallet plate is then placed over the mold and while holding such plate in position, the supporting plate and mold-box are swung over so as to invert the mold-box and cause the inverted shape to rest upon the pallet. The supporting plate is then swung back to original position in readiness for a subsequent operation, the impress of the raised characters carried thereby being left in the upper face of the molded shape. The workman then places a "push-plate" upon the material in the mold, and while holding the push-plate down with his thumbs, he carefully lifts the mold-box in such manner as to leave the molded shape standing upon the pallet plate, the push-plate being lifted with the mold-box after relative movement of the shape and the box has been initiated. The pallet plate with the molded shape thereon is then conveyed away for the subsequent operation of drying. The principal object of the present invention is to provide mechanical means for making plastic shapes from ground ganister or similar material and so constructed and arranged as automatically to form such shapes by a series of operations closely approximating those followed by the workman in accordance with the hand process above described. For filling the molds the present apparatus is adapted to utilize the process and appliances described in my above entitled patent, or other process or mechanism such for example as that disclosed in my copending application Serial No. 535,733, filed February 11, 1922.

While as herein disclosed, the preferred form of mechanism follows substantially the exact order of steps comprised in the hand process, it is evident that the various instrumentalities employed might, by the simple expedient of varying the relative timing of the operative agencies employed, be caused to act in a different manner, if for any reason it be found that such a change in the order of procedure is advantageous, and it is contemplated as being within the spirit of the invention that such change in the timing of parts may be made as occasion may warrant, as well as substitutions of other instrumentalities for those herein specifically disclosed, or the rearrangement of operative elements or supporting means employed may be made from time to time in accordance with changed working conditions or with variations in the material employed, or in the form or size of the shapes to be manufactured.

In the accompanying drawings there is disclosed one embodiment of means well adapted for carrying the above object into effect and exemplifying the numberless specific combinations and arrangements of mechanical parts and instrumentalities which might doubtless be devised for accomplishing the desired result.

In such drawings:

Fig. 1 is a plan view of the apparatus, the central longitudinal portion thereof being broken away in order to permit all of the operative parts to be shown in a single view;

Fig. 2 is a side elevation from the left-hand side of the machine, certain parts being broken away for clearness in illustration;

Fig. 3 is a side elevation of the right-hand side of the machine, certain of the supporting parts being broken away in this figure to show operative elements of the mechanism;

Fig. 4 is a transverse vertical cross section taken on the line IV—IV of Fig. 1, certain parts being shown in elevation:

Fig. 5 is a fragmentary, longitudinal cross section on the line V—V of Fig. 1, certain parts being shown in elevation;

Fig. 6 is a fragmentary horizontal cross section on a line VI—VI of Fig. 5;

Fig. 7 is a fragmentary horizontal cross section on the line VII—VII of Fig. 5;

Figs. 8, 9, 10, 11, 12 and 13 are fragmentary vertical cross sections in the plane of Fig. 5 and illustrating various steps in the operation of the mechanism;

Fig. 14 is a fragmentary plan view of the mold-board;

Fig. 15 is a fragmentary perspective view, illustrating one end of the mold-box with its supporting means;

Fig. 16 is a fragmentary side elevation showing details of the means for actuating the push-plate; and Fig. 17 is a fragmentary side elevation showing details of the mechanism for raising and lowering the mold-box.

Referring to the drawings the operative mechanism is shown as mounted upon a frame comprising the vertical posts 1, 2; 3, 4 respectively, such posts being preferably formed from angle iron. The posts 1 and 4 which are at the rear of the machine are substantially higher than the posts 2 and 3 at the front of the machine. Secured to the vertical posts are horizontal girder members 5, 6; 7, 8 respectively, the members 5 and 6 extending from front to rear of the machine in parallel relation. A second pair of girders 9, 10 also extend from front to rear, being secured to the front girder 8 and the rear girder 7. At the front portion of the machine four vertical posts 11, 12; 13, 14 are provided, such posts being secured to the girder members 9, 10 respectively and defining the angles of a substantially square auxiliary frame. The upper ends of these posts are connected by means of horizontal girders 15, 16; 17, 18 respectively.

At the rear portion of the frame a pair of posts 20, 21 are secured to the side girders 5, 6 respectively, such posts extending upwardly to substantially the same height as the rear posts 1 and 4. The latter posts are provided at their upper ends with angle brackets 22, while the upper ends of the posts 20 and 21 are provided with angle brackets 23, the brackets 22 and 23 preferably being so arranged that one flange of each extends horizontally and in the same plane.

Secured to the longitudinal girders 9, 10 respectively are a pair of posts 24, 25 arranged substantially in the vertical plane of the posts 20 and 21. These posts 24, 25, as illustrated, for example, in Fig. 7, are preferably of channel section, the channels thereof being directed rearwardly. These posts are provided with braces 26, 27 respectively, whereby they are properly held in vertical position. Secured to the front face of each of the posts 24, 25 is a member 28 providing a vertical guideway in which bars 29 are arranged to slide. Secured to the respective bars are a pair of channel members 30, 31 respectively, constituting the vertical side elements of a frame for supporting the mold-box and certain associated parts, such members being secured together at an intermediate point in their lengths by means of a transverse girder member 32 of substantial depth such as to secure proper rigidity of the frame. At their lower ends the members 30 and 31 are provided with rollers 33, 34 respectively, such rollers resting upon and being supported by cams 35, 36 of like configuration and which are secured to a shaft 37 mounted in bearings 38, 39 carried by the frame members 9, 10 respectively. These cams comprise substantially circular portions 40 concentric with the axis of the shaft, such circular portions merging into eccentric portions 41, the arrangement being such that upon rotation of the shaft 37 in a clockwise direction as viewed in Figs. 2 and 5, the frame comprising the members 30, 31, 32 will be lifted. The members 30, 31 are furnished at their upper ends with bearings 42, 43 respectively (see Fig. 6), such bearings providing aligned openings through which passes a shaft 44. The opening in the bearing 42 is of a size to form a journal for the shaft, but the opening in the bearing 43 is of somewhat larger diameter serving as a journal for a sleeve 45, which in turn provides a journal for the shaft 44. At its outer end the sleeve 45 has a pinion 46 fixedly secured thereto, and at its inner end a bracket member or ear 47 is fixed to this sleeve, such bracket member or ear depending from the forward edge portion of a mold-board 48 and constituting a support for the latter. The opposite end of the mold-board 48 is provided with a similar ear 49 having an opening through which the shaft 44 passes freely. It is thus clear that by rotation of the pinion 46 the shaft 45 will be turned, thereby swinging the mold-board about the axis of the shaft 44.

The member 31 is provided with a bracket 50 upon its right-hand face as viewed in Fig. 4, such bracket having a threaded opening for the reception of a shouldered bolt 51 upon which is journaled a gear 52, such gear meshing with the pinion 46 upon the sleeve 45. The gear 52 constitutes a crank disc having a projecting crank pin 53 to which one end of a connecting rod 54 is pivotally secured. The opposite end of such connecting rod is pivotally connected to the upper end of the rocker arm 55 turning about a stub shaft 56 carried by a bracket 57. This bracket 57 is mounted upon a plate 58 resting upon the longitudinal girder members 6 and 10. A pivot pin 59 is secured at an intermediate point in the length of the rocker arm 54 and upon such pin is mounted a latch member 60 having a shoulder or abutment surface 61 and an inclined cam face 62 at its outer extremity. A spring 60$^a$ is provided, such spring normally tending to swing the latch member 60 in a counterclockwise direction as viewed in Figs. 3 and 16 and such latch may be provided with a stop 60$^b$ for limiting such movement. The abutment surface 61 of the latch is arranged for engagement by a crank pin 63 carried by a crank disc 64 which is secured to a shaft 65. This shaft 65 is mounted in bearing 65$^a$, 65$^b$ carried by the girder members 5 and 10 respectively and constituting the main drive shaft of the machine. The connecting rod 54 is furnished with an outstanding pin 66 at a suitable point in its length and to such pin is secured one end of the coil spring 67, the opposite end of which is provided with a loop which may be attached to any convenient part, but which is here shown as taking over a pin 68 projecting from the center of the bolt 51 upon which the gear 52 turns.

To the upper ends of the members 30, 31 bracket arms 69, 70 are secured respectively, such bracket arms extending rearwardly in parallel relation and terminating in portions 71, 72 lying in a horizontal plane and constituting supports for the mold-board 48 when the latter is in normal position. Associated with the mold-board is a mold-box comprising a substantially rectangular frame 73 open at its top and bottom and provided if desired with a series of compartments 74 of a size and contour corresponding to the molded shape desired. This mold-box 73 has, extending from its forward portion, a pair of downwardly directed ears 75, 76 which are provided with aligned openings through which passes the shaft 44. This shaft thus constitutes a supporting axis about which the mold-box may be swung bodily to invert it. By reason of the arrangement of the parts it will be noted that in so inverting the mold-box it is moved from its normal plane as indicated in Fig. 5 to a horizontal plane somewhat below its normal plane and upon the opposite side of the vertical plane passing through the axis of the shaft 44.

Secured to the shaft 44 between the ears 49 and 75 is an arm 77 and a similar arm 78 is secured to the shaft 44 between the ears 76 and 47. The arms 77 and 78 are of like construction and extend in parallel relation. At their free extremities these arms are furnished with lugs 79, 80 respectively which are directed toward each other and which lie substantially in the same plane, these lugs constituting combined pallet clamping elements and mold-box lifting means. To permit the necessary movement of the mold-box and of the arms 77, 78, the mold-board is provided with a rearwardly extending slot 81 adjacent to each of its ends.

At the left-hand end of the shaft 44, as viewed in Fig. 4, a pinion 82 is fixed, such pinion meshing with a gear 83 turning upon a stud 84 secured in a bracket 84$^a$ which is fixed to the side member 30 of the vertical movable frame. A crank arm 85 is secured to the gear 83, having a crank pin 86 to which is secured one end of a telescopic connecting rod. This rod comprises the end member 87, connected to the crank pin 86, and having a sleeve portion 88 in which one extremity of the other end portion 89 of the connecting rod slides. A coil spring 90 is arranged within such sleeve, such spring tending normally to urge the members 87 and 89 in opposite directions, such movement being limited by a pin projecting from the member 89 and engaging a slot in the sleeve member. The member 89 of this extensible connecting rod is pivotally connected to a crank pin 91 carried by a crank 92 which is mounted upon the end of a shaft 93. This shaft extends transversely of the machine, being mounted in bearings 94, 95 carried by the frame members 15, 16 respectively. This shaft is also provided with a pinion 96 fixed thereto and which meshes with a gear 97. The pinion 96 and the gear 97 are mutilated or without teeth at certain portions of their peripheries, the untoothed portions being arranged to interlock when in engagement whereby to prevent undesired movement of the shaft 93. The gear 97 is provided with two such untoothed portions, one portion being of substantially semi-circumferential length, and the other being relatively short, the arrangement being such that during rotation of the gear 97 the pinion 96 is turned through two full rotations separated by a long interval and a short interval respectively.

A pair of bracket members 98, 99 are mounted respectively upon the frame members 15, 16, such bracket members having aligned openings therein forming journals for a transverse shaft 100. Secured to this shaft at points adjacent to the respective brackets are a pair of arms 101, 102 respectively, such arms adjacent to their free extremities comprising straight portions 103, 104. To these straight portions of the arms a push-plate 105 is secured, such push-plate comprising a series of box-like members 106 adapted respectively to fit within the cavities 74 in the mold-box when the latter is properly positioned to receive them. Secured to the shaft 105 is a collar 107 having an outstanding pin 108 to which one end of a coil spring 109 is secured. This spring surrounds the shaft 105 and its opposite end 110 is secured to the bearing bracket 98, the spring being so constructed and arranged that it normally tends to turn the shaft 100 in a clockwise direction as viewed in Fig. 2, such movement being limited by means of a stop or stops such as 111 carried by one or both of the bearing brackets. These stops are so arranged that in normal position the mold-board is substantially vertical as indicated in Fig. 2.

A crank arm 112 is secured to the shaft 100, such crank arm having a crank pin upon which one end of a connecting rod 113 is pivoted. The opposite end of such connecting rod is pivoted to the upper end of a rocker arm 114 pivoted upon a bracket 115, also mounted upon the plate 58. At an intermediate point in the length of rocker arm 114 a latch member 116 is pivotally secured, such latch member having an abutment shoulder 117 and a cam face 118 adjacent to its free extremity. The shoulder 117 is arranged for engagement by a crank pin 119 carried by the crank disc 64 above referred to and which is fixed upon the drive shaft 65. The cam surface 118 of the latch 116, as well as the cam surface 62 of the latch 60 is arranged for engagement with an inclined face 120 of a controlling bar 121 adjustably secured to the frame member 18 by means of pins 122 entering elongate slots in said bar. Engagement of the cam surfaces of the respective latch members with the inclined surface 120 serves to determine the instant of disengagement of the shoulders of the respective latch members upon the crank pins 63 and 119. The latch member 116 may be provided with a spring and a stop similar to those provided for the latch 60.

A pair of brackets 123, 124 are secured to the transverse frame member 17, such brackets having vertical guideways therein within which slide bars 125, 126 of angular cross section. Secured to the upper ends of these bars are rods 127, 128, these rods being bent rearwardly and lying in parallelism with each other and in the same horizontal plane. To the lower ends of the bars 125, 126, anti-friction rollers 129, 130 respectively are secured, such rollers resting respectively upon the peripheral surfaces of a pair of cams 131, 132 fixed upon a shaft 133. This shaft 133 is mounted in bearings 134, 135 carried by the longitudinal girders 5 and 10. These cams are of like construction and comprise substantially concentric circular portions 136 and abrupt descents 137. In the normal position of the parts, the rollers 129, 130 rest upon the circular or concentric portions of these cams, but upon rotation of the shaft 133 in a clockwise direction, as viewed in Fig. 5, the rollers encounter the cam inclines and are permitted to descend, thereby permitting the supporting members 127, 128 to move to a lower level. To one end of the shaft 133 a sprocket wheel 138 is secured with which a sprocket chain 139 engages, such chain also passing over a sprocket wheel 140 carried by a shaft 141 mounted in bearings 142, 143 supported by the frame members 5 and 9 respectively. Fixed to this shaft is a gear 145 meshing with a gear 146 secured to the drive shaft 65.

To the shaft 37 upon which the cams 35 and 36 are fixed is secured a crank arm 148 provided with a crank pin on which a connecting rod 149 is pivotally connected. This rod 149 is pivotally secured at its opposite end to a rocker arm 150 pivoted to a bracket 151 carried by the frame member 16. At an intermediate point in the rocker arm 150 a latch member 152 is pivotally secured, this latch member having an abutment shoulder 153 and a cam surface 154. This latch member passes under a member 155, the under side of such member constituting a cam actuating surface 156 against which the upper edge of the latch is normally held by means of the spring 157 whose upper end is secured to any convenient portion of the frame. The shoulder 153 is adapted to be engaged by a crank pin 158 carried by a crank disc 159 fixed to the drive shaft 65, the parts being so arranged that upon movement of the crank pin in a clockwise direction, as viewed in Fig. 2, the latch member will first be moved rearwardly, thereby causing the shaft 37 to turn in a clockwise direction and thus through the action of the cams 35 and 36 raising the mold-box supporting frame, and then upon disengagement of the shoulder 153 from the crank pin permitting the shaft 37 to rotate in the opposite direction, thus allowing the mold-box frame to drop. In order to assure such latter action, one end of a tension spring 150ª is connected to the lower part of the rocker arm 150, such spring being secured at its opposite end to a convenient part of the frame.

A pair of bracket arms 160, 161 project rearwardly from the transverse frame member 17, such bracket arms at their rear extremities being furnished with aligned journal openings for the reception of a shaft 162. This shaft is provided with a plurality of sprocket wheels over which pass chains such as 163, 164, such chains also engaging similar sprocket wheels upon a shaft 165 at the front of the machine mounted in brackets 166, 167 carried by the frame member 18. These sprocket chains are parallel to each other and the upper runs of such chains lie in the same horizontal plane, such chains collectively constituting a conveyer for moving the molded shapes from the molding mechanism to the front of the machine where they may be removed by the operator. Secured to one end of the shaft 165 is a sprocket wheel over which is carried a sprocket chain 168 which also passes over a sprocket wheel fixed to the shaft 65 so that the shaft 165 is compelled to move in time with, and in the same direction as the shaft 65.

Mounted upon the brackets 22 and 23 are transverse rails 169, 170 respectively, such rails preferably being formed as rack bars. Resting upon the respective rails are pinions 171, 172; 173, 174, such pinions being carried by shafts 174 and 175 which extend transversely between the rails. Suspended upon such shafts is a slicker carrying frame 176 having side members provided with openings in which the respective shafts are journaled. Mounted upon the lower member of this slicker frame is an electric motor 177 having a shaft provided with a beveled pinion 178. This pinion meshes with a beveled gear 179 carried by a vertical shaft journaled in bearings 180 in the frame and having a slicker disc 181 splined to its lower extremity. Interposed between the hub of such disc and the bearing is a compression spring 182, the parts being so arranged as to permit slight vertical movement of the disc upon the shaft while at the same time the disc is compelled to rotate with the shaft. The transverse shaft 183 is mounted in suitable supporting brackets carried by the frame 176 and a pair of beveled gears 184, 185 are mounted to turn freely upon such shaft, such gears meshing with the gear 179 at diametrally opposite points and thus being driven in opposite directions. Secured to the gears 184, 185 are sprocket wheels over which are trained sprocket chains 186, 187 respectively, such chains also passing about sprocket wheels 188, 189 turning freely on the shaft 174′ to which the pinions 171 and 172 are fixedly secured. The hubs of the sprocket wheels 188 and 189 are provided with clutch elements 190, 191 adapted alternately to engage with a double-ended clutch sleeve 192 splined to shaft 174 to turn therewith but movable axially thereof. This sleeve is provided with a centrally disposed circumferential flange 193. Adjacent the opposite sides of the machine, bridge members 194, 195 are arranged, such bridge members being secured to the brackets 22 and 23 and bridging the rails 169, 170 and the parts carried thereby. The bridge members 194 and 195 are provided respectively with depending brackets 196, 197, such brackets having cam faces 198, 199 respectively adapted to engage opposite faces of the flange 193 of the clutch sleeve 192, the arrangement being such that as the slicker carriage approaches one end or the other of the track formed by the rails 169, 170, the clutch sleeve is shifted by engagement of the cam surfaces of the brackets 196, 197 with one or the other side of the clutch sleeve flange.

Secured to the shaft 133 or to any other of the rotating parts which may turn in properly timed relation, is a cam disc 200 having a peripheral projection 201 adapted to engage a roller carried by a lever 202 conveniently pivoted upon the frame member 5. This roller is normally urged into engagement with the cam by the action of a spring 203. The opposite end of the lever serves to make electrical connection between a pair of contact terminals 204, 205 of an electrical circuit 206 in which the motor 177 is included. At 207 a chute or other suitable apparatus in indicated in dotted lines, whereby a charge of material may be delivered to the mold-box when the latter is in charge receiving position. Such charge delivering device may be of any suitable type, such, for example as is shown in my prior Patent No. 1,332,677 dated March 2, 1920, or in my co-pending application Serial No. 535,733 filed February 11, 1922.

In the operation of the mechanism, it being assumed that the mold-board 48 rests upon the supporting bracket members 71, 72 and that the mold-box 76 rests upon the mold-board and that the slicker carrying frame occupies the position shown in Fig. 1, the charge delivering apparatus is first actuated to deliver a charge of material 208 into the cavities of the mold-box, the position of the operative parts at this time being indicated in Fig. 5. At this time in the operation of the machine, the pinion 96 engages the semi-circumferential untoothed portion of the gear 97 so that there is a substantial pause in the turning of the shaft 93 and of the shaft 44 which is actuated thereby through the extensible connecting rod comprising the parts 87 and 89. The shaft 133 is moving, however, and is so timed that immediately upon filling of the mold, the motor 177 is energized, thereby causing the gear 184 to be turned and thus rotating the sprocket wheel 188 which at this time is clutched to the clutch sleeve 192. The latter is thus rotated thereby turning the shaft 184 and causing the slicker carriage to pass transversely across the width of the machine, the disc 181 being rapidly rotated. The plane of movement of the disc is such as to cause it to pass just above the upper edge of the mold-box, thereby wiping off surplus material from the latter while at the same time compacting the charge within the box. The slicker carriage passes to the left-hand side of the machine and the flange 193 of the clutch sleeve is thus caused to engage the cam surface 198 of bracket 196 whereupon the clutch member 190 is disengaged from the sleeve and the member 191 is brought into engagement therewith. The parts are thus in position to cause the carriage to travel backwardly across the width of the machine but substantially at this instant the cam projection 201 moves from beneath the roller carried by the lever 202, thus breaking the circuit of the electric motor and bringing the latter to rest so that the slicker carriage remains at the left-hand side of the machine. As soon as the slicking operation has been completed, a workman places a pallet plate 209 upon the filled mold, and immediately thereafter the toothed portion of the gear 97 engages the pinion 96, thereby causing the latter to turn through a full rotation. The motion of the shaft 93 is communicated to the shaft 44 through the connecting rod and crank arm 85, thus rocking the shaft 44 and causing the arms 77, 78 to swing upwardly until the members 79, 80 are caused to engage the upper surface of the pallet plate, thereby clamping the pallet plate firmly against the upper surface of the mold-box and at the same time holding the latter against the mold-board. The resiliently extensible connecting rod permits the members 79, 80 to be brought forcibly into engagement with the pallet plate while avoiding any possibility of breakage of the parts due to slight inaccuracies in timing. By the turning of the shaft 65 the crank pin 63 has been moved into position to engage the abutment shoulder 61 of the latch 60, such engagement taking place substantially at the instant at which the clamping members 79, 80 engage the pallet plate. Upon further movement of the crank disc 64 with the crank pin 63 the latter serves to move the latch member 60 forwardly, thus swinging the rocker arm 55 and by means of the connecting rod 54 turning the crank disc 52 in a clockwise direction as viewed in Fig. 3. The gear teeth of the crank disc 52, meshing with the pinion 46, serve to turn the latter in a counterclockwise direction as viewed in Fig. 3. At the same time the continued turning of shaft 93, which has already carried the crank arm 92 from the position of Fig. 2 to a position 180° therefrom, serves to move the crank arm 92 in such manner as to swing the crank arm 85 in a counterclockwise direction as seen in Fig. 2, thus turning the shaft 44 in the same direction that the sleeve 45 is being turned by the pinion 46 and at the same rate of speed. The clamping members 79, 80 thus move in an arcuate path while at the same time the mold-board turns about the axis of shaft 44 carrying with it the mold-box 73 and the pallet plate clamped thereto. The mold-board, mold-box and pallet plate thus swing as a unit about the axis of the shaft 44 until they are completely inverted as indicated in Fig. 9, the pallet plate being caused to rest upon the supporting members 127, 128 which at this time occupy their upper position lying in a plane substantially above that of the upper runs of the conveyer chains 163, 164. During the last part of the rotation of the shaft 93 and as the smooth portion of the pinion 96 is about to come into engagement with the shorter of the untoothed portions of the periphery of gear 97, the arms 77, 78 are caused to swing downwardly into the substantially vertical position shown in Fig. 9 where the clamping elements 79, 80 are removed from engagement with the pallet plate. At substantially the same instant the cam surface 62 of the latch member 60 has been brought into engagement with the cam face 120 of the bar 121 and has thereby been lifted so as to disengage the abutment shoulder 61 from the pin 63. The spring 67, which during the above operation has been placed under a tension, immediately contracts, thereby moving the connecting rod 54 rearwardly and through the crank disc 52 and the pinion 46 turning the sleeve 45 in such a direction as to swing the mold-board upwardly and back to its original position where it rests upon the supporting members 71, 72, the parts then occupying the position shown in Fig. 10. During the above interval, rotation of the crank disc 64 with shaft 65 has carried crank pin 119 into engagement with the shoulder 117 of the latch member 116. This latch member is thus drawn forwardly by the continued rotation of the shaft, and by means of the connecting rod 113 and the crank arm 112 turns the shaft 100 in a clockwise direction as viewed in Fig. 3, thereby swinging the push-plate down into contact with the material in the mold-box. At substantially the same time the crank pin 158 carried by the disc 159 has been brought into engagement with the abutment shoulder 153 of the latch 152, thereby moving such latch rearwardly and rocking the shaft 37 in such a manner as to cause the cams 35, 36 to elevate the frame carrying the mold-box and associated parts. The mold-box is thus caused bodily to rise while the push-plate is held against the material therein, such relative movement of the mold-box and push-plate continuing until the molded shape is substantially free of the box and resting upon the pallet plate 209. The cam surface 118 of the latch 116 now engages the cam incline 120 of the bar 121, thereby disengaging the latch 116 from the crank pin 119 and permitting the push-plate to be retracted by the action of the spring 109. Substantially at the same time the rotation of shaft 113 has brought the cam inclines 137 of the cams 131, 132 into such position as to permit the supporting members 127, 128 to move downwardly. As the pallet plate is at this time resting upon such members, it is caused to descend and as the members 127, 128 pass below the plane of the upper runs of the conveyer chains, the pallet plate with its molded shape thereon is deposited upon such conveyer members and is moved forward toward the front of the machine. The pinion 96 now engages the second toothed portion of the gear 97, thereby again rocking the shaft 44 and causing the arms 77, 78 to move upwardly in an arcuate path. The members 79, 80 then engage the edges of the mold-box 73 carrying the latter upwardly and causing it to drop into its original position upon the mold-board which at this time, as above stated, rests upon the supports 71, 72. As the pinion 96 completes its rotation the arms 77, 78 are swung downwardly until they occupy the position shown in Fig. 5 when the pinion 96 reengages the longer of the smooth portions of the gear 97. At a convenient time during this last operation, the cam incline 154 of the latch 152 engages the knock-off surface 156 thereby disengaging the abutment shoulder 153 from the pin 158, permitting the shaft 37 to be restored to its normal position by the action of spring 150$^a$, thus allowing the supporting frame upon which the mold-box and associated parts is mounted to drop to the original position ready for a second filling operation.

The machine thus continues to operate, the only difference in the succeeding operation being that the slicker carriage travels in the opposite direction toward the right-hand side of the machine where the clutch sleeve 192 is again shifted by engagement of its flange 193 with the cam surface 199 ready for reverse movement. As the molded shapes are brought forwardly by the conveyer chains, they are removed from time to time by the workman and carried to the drying rack or other convenient point.

The machine as thus constructed carries out the process of molding in substantially the same order of steps as is usually practiced by hand but in a much more expeditious fashion and without the expenditure of any substantial amount of hand labor. By reason of the mechanical operation of the parts the product of the machine is of more uniform character and of a quality superior to that which can be obtained by a purely manual operation. While as herein described certain specific mechanical arrangements have been employed for properly manipulating the necessary operative instrumentalities, it is to be understood that the invention is not necessarily limited to such specific arrangements of parts, but that other and equivalent means may be substituted therefor, as may from time to time be found convenient or desirable, without departing from the spirit of the invention, provided only that suitable means are furnished for operating the several parts in properly timed relation.

What I claim and desire to secure by Letters Patent of the United States is:

1. A machine for making plastic shapes comprising means normally disposed below a charge delivery device for receiving a charge delivered from the latter and molding it to shape, means for moving the receiving and molding means from normal position to invert the molded shape, for discharging the latter from the receiving and molding means, and for restoring the receiving and molding means to normal position, and means for conveying the molded shape away from the molding means.

2. A machine of the class described comprising automatically actuated means moving in timed relation for molding a plastic shape in upright position upon a mold-board normally disposed below a charge delivery device; for inverting the board with the shape thereon; for restoring the board to normal position; for ejecting the shape from the molding means; and for conveying the ejected shape away from the point of ejection.

3. A machine of the class described comprising means for molding a plastic shape upon a mold-board, means for inverting said shape with the mold-board, means for removing the mold-board from the shape, means for ejecting the shape from the molding means, and means for conveying the shape away from the molding means.

4. A machine of the class described comprising means for molding a shape upon a mold-board, means for holding a pallet plate against the upper surface of the molded shape, means for inverting said shape with the board and plate, means for removing the board from the inverted shape, and means permitting the pallet plate to descend and for ejecting the shape from the molding means.

5. A machine for making plastic shapes comprising molding means, a push-plate, means for causing the push-plate to descend into contact with the molded shape, means for causing the molding means to move relatively to the push-plate to eject the shape, a conveyor device, and means for receiving the ejected shape and for depositing it upon the conveyor device.

6. A machine of the class described comprising means for molding a plastic shape in upright position upon a mold-board, means for holding a pallet plate in contact with the upper face of such shape, means for inverting the mold-board and plate, together with the molded shape, means for removing the mold-board from the inverted shape, means for causing a push-plate to descend upon the shape, means for bodily lifting the molding means while ejecting the shape therefrom, and means for conveying away the pallet plate with the molded shape thereon.

7. A machine for making plastic shapes comprising a mold-box, normally stationary means for supporting such mold-box below a charge delivery device to receive a charge, and means operating in timed relation to turn said box about a horizontal axis into inverted position and to eject the charge from the box while in such position.

8. A machine of the class described comprising a mold-box mounted to turn freely about a fixed axis, normally stationary means for supporting said box in horizontal, charge receiving position below a charge delivery device, and means operating in timed relation for inverting the box and, after ejection of the charge, for restoring the box to initial position.

9. A machine for molding plastic shapes comprising a mold-box normally below a charge delivery device, means supporting said box to turn about a fixed axis, and power actuated means for turning said box alternately in opposite directions for receiving and discharging a charge of material.

10. A machine for molding plastic shapes comprising a mold-box normally positioned horizontally for receiving a charge, means providing an axis below the plane of the bottom of the box about which it may turn, and means for turning said box about such axis to inverted position and for moving it in the opposite direction to restore it to normal position.

11. A machine of the class described comprising a mold-box, normally stationary means for supporting said box in a horizontal position and below a charge delivering device, and means for swinging said box about an axis below and to one side of the same whereby simultaneously to invert the box and to move it from below said charge delivering device.

12. A machine of the class described comprising a mold-box, means normally supporting said box in a predetermined plane for receiving a charge, power actuated means for inverting said box and for moving it to a lower plane and power actuated lifting means for raising said box and restoring it to normal position, said power actuated means operating in timed relation.

13. A machine of the class described comprising a mold-box arranged to swing about a fixed axis from one horizontal plane to another and lower horizontal plane, and means also turning about said axis for moving it from such lower plane to the higher plane.

14. A machine of the class described comprising a mold-box, a horizontal shaft forming a supporting axis about which said box may turn, an arm secured to the shaft and having a member engageable with the box, and means for turning said shaft whereby to bring said member into engagement with the box for turning the latter.

15. A machine of the class described comprising a mold-box arranged to swing about a fixed axis from one horizontal plane to another, and an intermittently acuated rocker arm for swinging said box from a lower plane to a higher plane.

16. A machine for molding plastic shapes comprising a mold-box, a shaft forming a supporting axis about which said box is free to turn, an arm secured to the shaft, said arm having a laterally projecting member adjacent to its free extremity, and means for turning the shaft whereby to bring said projecting member into engagement with the box for moving the latter about the shaft as an axis.

17. A machine for making plastic shapes comprising a mold-box, a shaft upon which such box is supported for free turning movement, a pair of arms secured to said shaft at opposite ends respectively of the mold-box each of said arms having a lug adjacent to its free extremity, said lugs projecting toward one another, and means for turning said shaft whereby to bring said lugs into engagement with opposite end portions of the box for moving the latter about the shaft as an axis.

18. A machine for making plastic shapes comprising a shaft, a mold-box freely turning thereon, an intermittently rotating crank having connections for turning the shaft, and means carried by the shaft for turning the mold-box.

19. A machine for making plastic shapes comprising a shaft, a mold-box mounted to turn about the axis thereof, an intermittently driven shaft having a crank thereon, a connecting rod actuated by the crank, means for transmitting movement from the connecting rod to the shaft whereby to rock the latter alternately in opposite directions, and means for transmitting movement from the shaft to the box when the shaft is turning in one direction.

20. A machine for making plastic shapes comprising a mold-box, a shaft to one side of and below said box about which the box may turn as an axis, clamping means movable in an arcuate path about said shaft as an axis for clamping a pallet to the mold-box, and means for turning said box and clamping means at the same angular velocity whereby invert the mold-box while retaining the pallet in position thereon.

21. A machine for making plastic shapes comprising a mold-box having a lateral extension provided with depending ears, said ears having aligned openings therein, a shaft extending through said openings and serving as a pivotal axis for the box, a pair of arms secured to the shaft at opposite sides of said ears respectively, said arms having clamping projections thereon, means for swinging said arms whereby to bring said projections into clamping engagement with a pallet plate resting upon the box, and means for simultaneously turning said box and shaft at the same angular velocity whereby to invert the box while retaining the pallet in position thereon.

22. A machine for making plastic shapes comprising a mold-board, means normally supporting said board in horizontal position below a charge delivery device, power actuated means for inverting said board, and means for supporting it when inverted in a different horizontal plane.

23. A machine of the class described comprising a mold-board, means normally supporting said board in a horizontal plane below a charge delivery device, means for positioning a mold box upon the board when the latter occupies normal position, and power actuated means for turning said board about an axis below said plane whereby to invert the board and cause it to lie in a plane below its normal plane, and means for supporting the board in such inverted position.

24. A machine of the class described comprising a mold-board, means normally supporting such board in a horizontal plane, pivotal means defining an axis about which such board may turn, means for turning said board in a given direction about such axis, and other means for restoring the board to normal position.

25. A machine for making plastic shapes comprising a mold-board, means supporting said board to turn about a horizontal axis, means normally supporting said board in a horizontal plane, means for turning said board at a relatively slow rate about such axis to invert it, and means for turning said board back to its normal position at a relatively rapid rate of speed.

26. A machine for making plastic shapes comprising a mold-board, means defining an axis about which such board may turn, releasable means for turning said board in one direction to a predetermined degree, and resilient means for restoring the board to its original position.

27. A machine of the class described comprising a pivotally supported mold-board, a rocker arm, a power driven shaft, automatically releasable means for intermittently transmitting movement from the shaft to the rocker arm to rock the latter in one direction, resilient means for moving the rocker arm in the other direction, and means connecting the rocker arm with the mold-board.

28. A machine of the class described comprising a mold-board, means normally supporting said mold-board in a substantially horizontal plane, a pair of ears projecting downwardly from said mold-board adjacent to opposite ends thereof, said ears having alined journal openings, means engaging the respective openings and defining a pivotal axis about which the board may be turned, and intermittently operating power actuated means for turning board about such axis.

29. A machine for molding plastic shapes comprising a mold-board, a pair of spaced ears projecting from such board, said ears having alined journal openings therein, a shaft extending through the respective openings and defining an axis about which the board may turn, a sleeve upon said shaft, said sleeve being fixedly secured to one of said ears, a pinion fast to said sleeve, and means for turning said pinion alternately in opposite directions.

30. A machine of the class described comprising a mold-board mounted to turn about a substantially horizontal axis, a power shaft having a crank disc thereon, a crank pin projecting from the disc, a latch member engageable with said pin to receive movement from the latter, cam means for releasing the latch from the pin after a predetermined movement, and means connecting the latch member with the mold-board whereby to impart turning movement to the latter.

31. A machine for molding plastic shapes comprising a mold-board mounted to turn about an axis substantially parallel to its longitudinal edge, a power shaft having a crank element, a rocker arm, a releasable latch for connecting the rocker arm with the crank element whereby to swing the rocker arm in one direction, means for releasing the latch from the crank element, means for moving the rocker arm in the opposite direction, and means for connecting the rocker arm with the mold board whereby alternately to turn the latter in opposite directions.

32. A machine for making plastic shapes comprising a mold-board mounted to turn about a horizontal axis, a sleeve concentric with said axis and secured to the mold-board, a pinion fixed to the sleeve, a gear meshing with the pinion and having a crank pin fixed therein, a rocker arm, a rod connecting said crank pin and rocker arm, a power shaft, a crank pin turning therewith, a latch member pivotally secured to the rocker arm and engageable by the crank pin to swing the rocker arm in one direction, an adjustable cam for disconnecting the latch from the crank pin, and a spring connected to the rocker arm for moving the latter in the opposite direction when the latch is released.

33. A machine of the class described comprising a normally stationary mold-board, a mold-box normally resting thereon for receiving a charge, means supporting the board and box for independent movement, and means for simultaneously inverting said board and box while maintaining their relative positions unchanged.

34. A machine of the class described comprising a normally stationary mold-board, a mold-box resting thereon when in charge receiving position, means supporting the board and box for independent movement about a common axis, and means for imparting bodily movement to said board and box while maintaining their relative positions unchanged.

35. A machine for molding plastic shapes comprising a mold-board, fixed means normally supporting said board in horizontal position, a mold-box resting upon said board when in charge receiving position, means for simultaneously inverting said board and box, and means for restoring said box to normal position independently of the board.

36. A machine of the class described comprising a mold-board and a mold-box resting thereon when in charge receiving position, common means for simultaneously inverting the board and box, such means also acting to restore the board to normal position, and independent means, operative subsequently to the restoration of the board, for restoring the box to normal position.

37. A machine of the class described comprising a mold-board, normally stationary means for supporting said board in horizontal position and below a charge delivering device, a mold-box normally resting upon said board for receiving a charge from said device, and means for swinging said board and box simultaneously about an axis below and to one side of the box whereby to invert the board and box and to move them bodily from below the charge delivering device.

38. A machine of the class described comprising a mold-board mounted to turn about an axis adjacent to one of its edges but outside its plane, a mold-box normally resting upon said board and also mounted to turn about the same axis, and means for simultaneously swinging said board and box about such axis to inverted position.

39. A machine of the class described comprising a normally horizontal mold-board and a mold-box normally resting thereon, said box and board each having spaced ears projecting downwardly therefrom adjacent to their corresponding longitudinal edges, said ears having aligned openings therein, a shaft passing through the several openings and forming an axis about which said box and board may turn, means connected to one of the ears projecting from the board for turning the latter (with the box thereon) to inverted position, said means also acting to restore the board to normal position, and independent means engageable with the box for restoring the latter to normal position.

40. A machine of the class described comprising a mold-board, a mold-box, and a pallet plate for covering the box, means for inverting the board, box and plate, and means for clamping said parts in fixed position while being inverted, said means being constructed and arranged subsequently to restore the box to initial position.

41. A machine for making plastic shapes comprising means for clamping a filled mold-box between a mold-board and pallet plate, means for inverting the parts while so clamped, subsequently acting means whereby the mold-board is removed from the box and the box is released from the pallet plate, and means for restoring the box to normal position.

42. A machine of the class described comprising a mold-board and a mold-box resting thereon when in charge receiving position, means for clamping a pallet plate upon the mold-box, means for inverting the mold-board and box while holding the pallet plate clamped to the latter, said clamping means being automatically released upon completion of such inversion, and means for returning the mold-board to normal position.

43. A machine of the class described comprising a mold-board and mold-box arranged for simultaneous inversion, a clamping element for holding a pallet plate upon the mold-box during such inversion, means for rendering the clamping element inoperative when inversion of the parts is complete; and resilient means for subsequently returning the mold-board to normal position.

44. A machine of the class described comprising a mold-box, supporting means comprising a shaft about which the box may turn as an axis, means for turning the box about such axis, and means for moving the shaft bodily and in a vertical direction.

45. A machine of the class described comprising a mold-box, a shaft upon which such box is supported, vertically movable bearings for said shaft, and cam means for simultaneously raising said bearings.

46. A machine of the class described comprising a vertically slidable frame, a mold-box mounted in said frame to turn about a horizontal axis, and an oscillatory cam for alternately raising and lowering said frame.

47. A machine for making plastic shapes comprising vertical guideways, shaft bearings slidable in the respective guideways, a shaft turning in said bearings, a mold-box mounted to turn on the shaft, means for turning the box alternately in opposite directions, and means for raising said bearings.

48. A machine for making plastic shapes comprising vertically movable shaft bearings, a shaft turning therein, a mold-box supported upon the shaft, means for moving the shaft vertically, and means having operative connection with the shaft in all positions thereof for turning it.

49. A machine of the class described comprising a vertically movable mold-box, an oscillatory cam for raising and lowering the box, power actuated means comprising a cam controlled latch for turning the cam for raising the box, and resilient means, operative upon release of the latch for turning the cam to permit the box to descend.

50. A machine of the class described comprising a shaft mounted to turn in vertically movable bearings, a mold-box supported upon the shaft, and power means, including an extensible connecting rod, operable in all positions of the shaft, for imparting turning movement to the latter.

51. A machine of the class described comprising a shaft mounted for bodily movement in a vertical plane, a mold-box supported upon the shaft, a crank device movable vertically with the shaft, means for transmitting movement from the crank device to the shaft, an extensible connecting rod having one end secured to the crank device, and a rotating crank for imparting reciprocating movement to the connecting rod.

52. A machine of the class described comprising a vertically movable frame, a shaft mounted in bearings therein, a mold-box on the shaft, a pinion fast to the shaft, a gear mounted upon a stub shaft carried by the frame, said gear having a crank pin projecting from its face and meshing with the pinion, a telescopic connecting rod comprising an element pivoted upon said crank pin, a power actuated crank pivotally engaging a second element of the rod, and resilient means reacting against the opposed ends of such elements.

53. A machine of the class described comprising a vertically movable mold-box, a shaft having a cam thereon for moving the mold-box vertically, a rock arm secured to the shaft, a power actuated crank pin, and a driving latch engageable by said crank pin during its rotation and serving to transmit movement therefrom to the rock arm.

54. A machine of the class described having a vertically movable mold-box and means for moving said box comprising a rotating crank pin, a latch member having a shoulder for engagement by said pin, resilient means normally tending to hold said shoulder in engagement with the pin, and cam means for disengaging said shoulder from the pin at a predetermined point in the rotation of the pin.

55. A machine of the class described having a vertically movable mold-box, and means for moving said box comprising a rocker arm, a latch member pivotally secured thereto, said latch having a shoulder, a rotating crank pin engageable with said shoulder, resilient means normally tending to hold said latch member with its shoulder in the path of the pin, an inclined cam face upon the latch member, and a normally fixed abutment engageable with said cam face and cooperating therewith to disengage the shoulder from the pin at a predetermined point in the rotation of the latch.

56. A machine of the class described comprising a mold-board and a mold-box, and a power actuated shaft provided with means for moving the mold-board and mold-box in arcuate paths, and for moving the mold-box bodily in a rectilinear path.

57. A machine for making plastic shapes comprising a mold-box, and a mold-board, a shaft forming a pivotal axis about which said box and board may turn, bearings for said shaft, means for turning said board and box, and means for simultaneously raising the shaft bearings whereby to raise the box bodily in a vertical direction.

58. A machine of the class described, comprising an invertible mold-box, means for inverting the box, means for lifting the inverted box bodily in a rectilinear vertical path, and means for preventing the charge from partaking of the upward movement of the box.

59. A machine of the class described comprising an invertible and vertically movable mold-box, means for inverting the box, means for moving a push-plate into a position above the inverted box, and means for subsequently moving the box vertically with relation to the push-plate.

60. A machine of the class described comprising a mold-box, means supporting said box to swing in an arcuate path, and a push-plate also moving in an arcuate path and into a position above the mold-box.

61. A machine of the class described comprising an invertible mold-box, means for inverting it, a push-plate cooperable therewith, and means for positioning the push-plate over the inverted mold-box.

62. A machine of the class described comprising a mold-box, means for supporting the mold-box to turn about a fixed axis for inverting it, a push-plate, and means for moving the push-plate into position above the mold-box when the latter is inverted.

63. A machine for making plastic shapes comprising a mold-box, means for moving said box bodily from filling position to discharging position. a pivotally supported push-plate, and means for moving said push-plate into a position above the box when the latter is in discharging position.

64. A machine of the class described comprising an invertible mold-box, a push plate, power actuated means for moving said push-plate into operative position relatively to the mold-box when the latter is inverted, and resilient means for returning the push-plate to normal position.

65. A machine of the class described comprising a push-plate, means normally holding the plate in a substantially vertical, inoperative position, and means for moving the plate into substantially horizontal, operative position.

66. A machine of the class described comprising a mold-box movable about a horizontal axis from a horizontal charge receiving position to one side of the vertical plane of said axis to a horizontal, charge delivering position upon the other side of said plane, and a push-plate movable into cooperative relation to said box when in the latter position.

67. A machine for making plastic shapes comprising a mold-box movable in an arcuate path from an upper, charge receiving position to a lower, charge delivering position, a push-plate movable in an arcuate path into a position above the box when the latter is in delivering position, and means for moving said box and push-plate in timed relation relatively to one another.

68. A machine of the class described comprising a mold-box and push-plate movable in intersecting arcs, and means for moving them in timed relation whereby successively to move them into charge ejecting position.

69. A machine for making plastic shapes comprising a push-plate, means for moving said push-plate from inoperative to operative position at a relatively slow rate of speed, and means for restoring the push-plate to inoperative position at a relatively high rate of speed.

70. A machine for making plastic shapes comprising a push-plate movable in an arcuate path about a horizontal axis, resilient means normally tending to retain the push-plate in inoperative position, and means comprising a cam released latch member for moving the push-plate to operative position.

71. A machine for making plastic shapes comprising a horizontal shaft, parallel arms fixed thereto, a push-plate secured to the arms, resilient means tending to turn the shaft, stop means normally holding the shaft against rotation with the push-plate lying in a substantially vertical plane, and means for turning the shaft in opposition to said resilient means whereby to bring the plate to horizontal position.

72. A machine of the class described having a mold-box and a push-plate cooperable therewith, and means for actuating the push-plate comprising a rotating crank pin, a latch member having a shoulder engageable by the crank pin, means for connecting the latch member with the push-plate, and means for releasing the latch member from the crank pin at a predetermined point in the rotation of the latter.

73. A machine for making plastic shapes comprising a horizontal belt conveyor, a pair of vertically movable bars arranged respectively at either edge of the conveyor, a horizontally extending supporting arm carried by each bar, and cam means normally supporting said bars with the supporting arms thereof in a plane above the conveyor, said cam means being constructed and arranged to permit simultaneous descent of the bars at predetermined times.

74. A machine of the class described comprising a conveyor for moving a molded shape in a substantially horizontal path, a pair of spaced, vertically movable bars, a horizontally extending arm adjustably secured to each of the bars, a rotating shaft having a pair of cams secured thereto, each of said cams having a substantially arcuate portion normally serving to support the respective bars with their arms in a plane above that of the conveyor, and having depressions to permit simultaneous descent of the bars whereby to bring the arms into a plane below that of the conveyor, and means to rotate the shaft.

75. A machine for making plastic shapes comprising a mold-board, a mold-box normally resting thereon, means for slicking off surplus material from the top of the box, means for inverting the box and board, vertically movable means for receiving the molded shape from the box, and an endless conveyor for carrying the shape away from such receiving means.

76. A machine of the class described comprising a mold-board, a mold-box resting thereon when in filling position, means for slicking off surplus material from the top of the box, means for clamping a pallet plate to the top of the box, means for simultaneously inverting the box, board, and pallet plate, means for restoring the board to normal position, means for moving a push-plate into contact with the top surface of the inverted shape within the box, means for raising the box bodily and relatively to the push-plate to eject the shape, means for restoring the box and push-plate to normal position, a vertically movable support for receiving the pallet with the ejected shape resting thereon, a conveyor device, and means for lowering the support to deposit the pallet plate upon the conveyor.

Signed by me at Boston, Massachusetts, this twenty ninth day of June 1922.

C. L. NORTON.